(12) United States Patent
Fishkin et al.

(10) Patent No.: US 10,402,467 B2
(45) Date of Patent: Sep. 3, 2019

(54) COMPUTER DEVICE AND METHOD FOR DETECTING CORRELATIONS WITHIN DATA

(71) Applicant: SIEMENS AKTIENGESELLSCHAFT, München (DE)

(72) Inventors: Alexey Fishkin, München (DE); Anthony Latimer, Lincoln (GB); Adam Marsden, Lincoln (GB); Mikhail Roshchin, München (DE)

(73) Assignee: Siemens Aktiengesellschaft, München (DE)

( * ) Notice: Subject to any disclaimer, the term of this patent is extended or adjusted under 35 U.S.C. 154(b) by 54 days.

(21) Appl. No.: 15/553,510

(22) PCT Filed: Jan. 26, 2016

(86) PCT No.: PCT/EP2016/051509
§ 371 (c)(1),
(2) Date: Aug. 24, 2017

(87) PCT Pub. No.: WO2016/134900
PCT Pub. Date: Sep. 1, 2016

(65) Prior Publication Data
US 2018/0039602 A1 Feb. 8, 2018

(30) Foreign Application Priority Data
Feb. 24, 2015 (GB) .................................. 1503035.6

(51) Int. Cl.
*G06F 17/15* (2006.01)
*G06K 9/00* (2006.01)
(Continued)

(52) U.S. Cl.
CPC .......... *G06F 17/15* (2013.01); *G05B 19/408* (2013.01); *G06K 9/00536* (2013.01); *G05B 19/04* (2013.01)

(58) Field of Classification Search
CPC ........................................................ G06F 17/15
(Continued)

(56) References Cited

U.S. PATENT DOCUMENTS

2006/0136259 A1* 6/2006 Weiner .................. G06Q 10/10
705/2
2007/0118399 A1* 5/2007 Avinash ................ G06F 19/328
705/2
2011/0320186 A1 12/2011 Butters et al.

FOREIGN PATENT DOCUMENTS

CN 1184931 A 6/1998
EP 2400401 A2 12/2011

OTHER PUBLICATIONS

Feldman, Dan, et al. "idiary: From GPS Signals to a Text-searchable Diary." ACM Transactions on Sensor Networks (TOSN) 11.4 (2013): 60.
(Continued)

*Primary Examiner* — Tan V Mai
(74) *Attorney, Agent, or Firm* — Lempia Summerfield Katz LLC (57) ABSTRACT

The computer device (10) comprises a receiving unit (1) for receiving numerical data (11) and logical data (12) from the technical system (100), a selection unit (2) for selecting a subset (13) of the numerical data (11), a processing unit (3) for processing the subset of the numerical data (11) and the logical data (12) by converting the subset of the numerical data (11) and the logical data (12) into text-based data and by detecting predefined events in the text-based data, a comparison unit (4) for comparing the detected events with predefined queries, wherein the predefined queries describe
(Continued)

correlations between detected events, to provide a comparison result, and a signaling unit (5) for outputting a signal (13) based on the provided comparison result. By converting numerical data and logical data into text-based data, correlations within the data can be easily detected based on predefined queries, which are also in text-based form. Further, a technical system comprising such a computer device and a corresponding method are provided.

18 Claims, 2 Drawing Sheets

(51) Int. Cl.
*G05B 19/408* (2006.01)
*G05B 19/04* (2006.01)

(58) Field of Classification Search
USPC ............................................. 708/422
See application file for complete search history.

(56) References Cited

OTHER PUBLICATIONS

PCT International Search Report for corresponding PCT/EP2016/051509, dated May 24, 2016.
PCT Written Opinion of the International Preliminary Examination Report dated Jun. 12, 2017, for corresponding PCT/EP2016/051509.
Sarkar, Soumik, et al. "Multi-sensor information fusion for fault detection in aircraft gas turbine engines." Proceedings of the Institution of Mechanical Engineers, Part G: Journal of Aerospace Engineering 227.12 (2013): 1988-2001.

* cited by examiner

COMPUTER DEVICE AND METHOD FOR DETECTING CORRELATIONS WITHIN DATA

The present patent document is a § 371 nationalization of PCT Application Serial Number PCT/EP2016/051509, filed Jan. 26, 2016, designating the United States, which claims the benefit of GB 1503035.6, filed Feb. 24, 2015. The entire contents of these documents are hereby incorporated herein by reference.

BACKGROUND

The present embodiments relate to detecting correlations within data received from a technical system.

In several technical systems (e.g., rotating equipment like turbines or generators), diagnostics itself and related diagnosis procedures involve a comprehensive analysis of very large volumes of data for a longer time period depending on the complexity of an investigated problem. The data consists of both textual messages from control units in the form of text strings (e.g., events in this domain) and sensor signals (e.g., measurements).

Events from control units, also known as sequences of events, may contain significant information for diagnostics. Analysis based on this information by itself, however, is time and cost expensive and is not related to further information from sensors.

In common systems, methods that use either nominal information such as text mining, ontologies, complex event processing, or use numerical data such as discrete and stochastic methods, learning algorithms, and generally mathematics are used.

SUMMARY AND DESCRIPTION

The scope of the present invention is defined solely by the appended claims and is not affected to any degree by the statements within this summary.

The present embodiments may obviate one or more of the drawbacks or limitations in the related art. For example, I the processing of data received from technical systems based on numerical, logical, and nominal data is improved. A computer device for detecting correlations within data received from a technical system is provided. The computer device includes a receiving unit for receiving numerical data and logical data from the technical system. The computer device also includes a selection unit for determining dependencies between data of the numerical data being described by the logical data and for selecting a subset of the numerical data. The subset corresponds to data of the numerical data having dependencies that correspond to predefined conditions. The computer device also includes a processing unit for processing the numerical data and the logical data by converting the numerical data and the logical data into text-based data and by detecting predefined events in the text-based data. The computer device includes a comparison unit for comparing the detected events with predefined queries to provide a comparison result. The predefined queries describe correlations between detected events. The computer device includes a signaling unit for outputting a signal based on the provided comparison result.

The computer device is based on the idea of converting the received numerical data into text-based data (e.g., nominal data) such that a comparison with text-based queries may be easily performed. Users who have no further knowledge of programming or programming languages may thus formulate text-based queries that may directly be compared with events detected in the converted text-based data. The text-based data may be based on a grammar that may be defined beforehand. The grammar may define events as well as any kind of correlation using a specific language based on the grammar.

In order to reduce the amount of numerical data to be processed (e.g., converted), the selection unit selects a subset of the numerical data to be converted into text-based data. As the receiving unit receives numerical data as well as logical data from the technical system, this selection may be done using dependencies between single data or information of the numerical data. For example, the numerical data include processes being dependent on each other. The logical data describes such dependencies. The selection unit may then select only the data of the numerical data that fulfills predefined conditions. The conditions define such dependencies.

The selection unit, the processing unit, the comparison unit, and the signaling unit may be separate units or may be combined (e.g., in a central processing unit).

The processing unit, when converting the subset of numerical data and the logical data into text-based data, may perform an analysis of the received subset of numerical and logical data and transform the subset of numerical and logical data into text-based data including the information of the subset numerical and logical data in text-based form. Converting in this context may thus refer to analyzing and transforming numerical and logical data into text-based data. The processing unit may then examine the text-based data in view of predefined events. The predefined events may be stored in a database and describe or define, for example, specified conditions of the technical system.

Computer device in this context may refer, for example, to a personal computer or workstation but also to mobile devices like smartphones or tablet PCs. The computer device may include a display unit such as a monitor for displaying the output signal to a user. According to an embodiment, the predefined conditions include a start condition and/or an availability condition.

Thus, for example, only when specific numerical data are available (e.g., fulfill a logical operation of being available), the specific numerical data are included into the subset. As another example, numerical data may need to fulfill a specific start condition being indicated by a logical operation. Also, other predefined conditions may be provided.

According to a further embodiment, the signaling unit is adapted to output a signal when the result of the comparison is positive.

The comparison unit may perform a comparison of the events of the text-based data and the predefined queries, which may also be in text form. If the query describes a correlation between two events, the comparison unit determines whether both events are fulfilled. If yes, the signal unit outputs a signal. The signal may be, for example, a warning signal informing a user about the occurrence of the combination of the events.

According to a further embodiment, the receiving unit is adapted to receive numerical sensor data and logical sensor data from a plurality of sensors of the technical system and/or numerical measurement data and logical data from at least one measurement unit of the technical system.

The technical system may include at least one sensor sensing, for example, a temperature, speed, rotation or any other kind of condition or status being measurable by sensors. In addition or alternatively, the technical system may include measurement units for measuring information within the technical system. The data from a plurality of sensors may be handled as multiple data over time.

According to a further embodiment, the receiving unit is adapted to receive operation commands from at least one control unit of the technical system, and the comparison unit is adapted to compare the detected events and the operation commands with predefined queries.

In addition to sensor data or measurement data, operation commands may be taken into account when comparing the received numerical data, after conversion, with predefined queries. For example, a query may define that the user wants to be informed if a specific operation command has been issued and a specific event (e.g., a specific condition or status) of the technical system occurs.

According to a further embodiment, a predefined query describes a correlation between a plurality of detected events.

The queries may also describe more than two events that are to be fulfilled before resulting in an output signal. These events may have a relation to each other, but may also be independent from each other.

According to a further embodiment, the predefined query describes a temporal correlation between the plurality of detected events. According to this embodiment, at least two events may have a temporal correlation. The temporal correlation may be an offset between two or more events or may describe that the two or more events occur at the same time. Also, a combination of these correlations may be described (e.g., two events occur at the same time and the third event occurs at a predefined time interval later).

According to a further embodiment, the predefined query describes a logical correlation between the plurality of detected events.

A logical correlation may correspond to any known logic operations like AND, NOR, NAND, XOR and so on. Also, a combination of temporal and logical correlations may be described by the predefined queries.

According to a further embodiment, the processing unit includes a filter for filtering specific detected events. According to this embodiment, specific detected events may be ignored by filtering. Thus, it may be defined in a query that some events are to be fulfilled, whereas other events are ignored.

According to a further embodiment, the detected events include a trend of the detected event, a gap within the detected event, a minimum value of the detected event, a maximum value of the detected event, an average value of the detected event, or any combination thereof.

If an event describes a changing or varying signal like temperature, voltage, current, speed or the like, the processing unit may determine the kind of change when detecting the events. These changes or variations within the signals may be part of predefined queries that then describe a varying event and not only a static event. However, a detected event may also correspond to a threshold such as a minimum value or maximum value.

A trend of an event may also be detected when the event describes a changing or varying signal having some drops or peaks. The trend may be detected as a trend over a specific time (e.g., over the time interval, the trend may be detected although there are some distortions (upward or downward) within the time interval).

According to a further embodiment, the computer device further includes an input unit for receiving input information from a user. The input information includes predefined queries.

The input unit may be, for example, a monitor, a keyboard, a mouse, a touchpad, or any other kind of input unit.

According to a further embodiment, the input information is in text-based form. As the input information is in text-based form, also users having no deeper knowledge of programming languages may define and input queries.

The above described computer device provides a simple approach to combine text-based information (e.g., predefined queries from users and operation commands from control units of the technical system), as well as numerical data and logical data from sensors. By filtering and preprocessing huge amounts of numerical data and logical data, which may be done directly by a diagnosis engineer, not a programmer, the comparison of the numerical data in combination with the logical data and the text-based queries may be easily performed. The computer device thus provides a user friendly way to represent rules (e.g., queries and comparison results) based on sensor measurements and characteristics of the measurements without any advanced knowledge of mathematics. An automated correlation of various sensor measurements may be performed by using various logical operators (AND, OR, NOT, etc.), as well as temporal correlations (after, before, coincides, etc.) for high-dimensional data. By placing together both information sources (e.g., numerical and text-based data) from any technical system (e.g., from rotating equipment) in the form of events in order to process the events within one computer device, knowledge may be shared among various diagnosis engineers in well-known language without further knowledge of mathematics or programming languages. According to a further aspect, a technical system is provided. The technical system includes a plurality of sensors for providing numerical data and logical data from the technical system, and a computer device, as described above.

According to an embodiment, the technical system is a wind turbine, a gas turbine, a steam turbine, a compressor, or a generator. The sensors of the technical systems may be any sensors for detecting and/or monitoring conditions of the technical system (e.g., of rotating equipment).

According to a further aspect, a method for detecting correlations within data received from a technical system is provided. The method includes receiving numerical data and logical data from the technical system, determining dependencies between data of the numerical data being described by the logical data, and selecting a subset of the numerical data. The subset corresponds to data of the numerical data having dependencies that correspond to predefined conditions. The method also includes processing the numerical data and the logical data by converting the numerical data and the logical data into text-based data and by detecting predefined events in the text-based data. The method includes comparing the detected events with predefined queries to provide a comparison result. The predefined queries describe correlations between detected events. The method also includes outputting a signal based on the provided comparison result.

According to a further aspect, one or more of the present embodiments relate to a computer program product including a program code for executing the above-described method for detecting correlations within data received from a technical system when run on at least one computer.

A computer program product, such as a computer program device, may be embodied as a memory card, USB stick, CD-ROM, DVD (e.g., a non-transitory computer-readable storage medium), or as a file that may be downloaded from a server in a network. For example, such a file may be provided by transferring the file including the computer program product from a wireless communication network.

The embodiments and features described with reference to the apparatus of the present embodiments apply mutatis mutandis to the method of the present embodiments. Further possible implementations or alternative solutions of the present embodiments also encompass combinations, which are not explicitly mentioned herein, of features described above or below with regard to the embodiments. The person skilled in the art may also add individual or isolated aspects and features to the most basic form of the present embodiments.

BRIEF DESCRIPTION OF THE DRAWINGS

In the figures, like reference numerals designate like or functionally equivalent elements, unless otherwise indicated.

DETAILED DESCRIPTION

Figure 1:
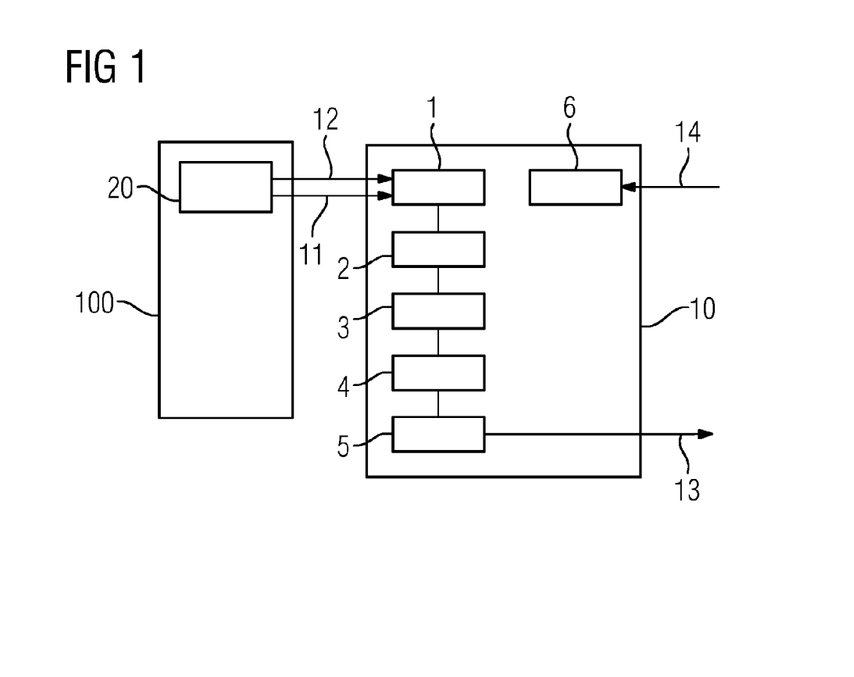
FIG. 1 shows a first example of a representation of a computer device for detecting correlations within data received from a technical system.

FIG. 1 illustrates a first example of a computer device 10. The computer device 10 includes a receiving unit 1 for receiving numerical data 11 and logical data 12 from sensors 20 of a technical system 100. The receiving unit 1 may be coupled to sensors or may be coupled to a sending unit of the technical system 100.

A selection unit 2 determines dependencies between data of the numerical data 11. The dependencies are described by the logical data 12. The selection unit 2 selects a subset of the numerical data 11. The subset corresponds to data of the numerical data 11 having dependencies that correspond to predefined conditions. A processing unit 3 processes the numerical data 11. The processing unit 3 converts the numerical data 11 into text-based data and detects predefined events in the text-based data. A comparison unit 4 compares the detected events with predefined queries to provide a comparison result.

The predefined queries are input as input information 14 to an input unit 6. The predefined queries describe correlations between detected events (e.g., temporal or logical correlations). A signaling unit 5 outputs a signal 13 based on the provided comparison result. The signal 13 may be a warning signal to indicate a specific combination of events.

Figure 2:
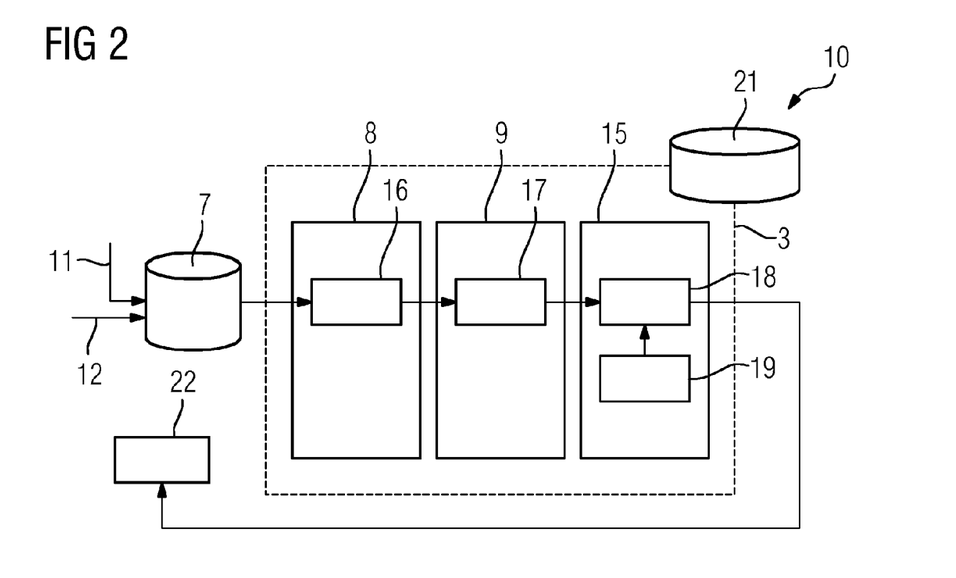
FIG. 2 shows a second example of a representation of a computer device for detecting correlations within data received from a technical system.

In FIG. 2, a second example of a computer device 10 is illustrated. The processing unit 3 is shown in detail. The remaining parts of the computer device 10 of FIG. 1 may also be present, although not shown in FIG. 2.

The numerical data 11 and the logical data 12 are stored in a database 7. The processing unit 3 includes a further database 21 in which predefined events as well as queries may be stored.

The numerical data 11 and the logical data 12 may be retrieved by a mathematical processing unit 8. The mathematical processing unit 8, which includes a processor 16, determines mathematical events such as average values, minimum values, or maximum values. In a processing recognition unit 9, which includes an event emitter 17 for detecting further events, trends of the data 11, or gaps within the data 11, may be recognized. The processing recognition unit 9 is adapted to detect logical or temporal characteristics of the events. In an event processing unit 15, which includes a processor 18, logic rules may be applied by a logic rules converter 19. Thus, the detected events may be preprocessed before being supplied to the comparison unit 4, which is not shown in FIG. 2.

The finally detected events may be shown on a display unit 22. Also, the comparison result may be displayed on the display unit 22.

An example of a grammar being used for describing events and correlations between events will be explained in the following. Other grammar may be used, or the described grammar may be extended.

The grammar for describing events and correlations may be context free. An "event" and its definition are considered to be a term of a category signal. The following are examples of the language (e.g., grammar) that may extend an event processing technology "Drools Fusion":

```
<formula>            ::=   <formulaHeader> = <logicalExpression>;
<formulaHeader>             ::= (<signalVariable> :)? signal(String)
                                  <attributes>*
<variable>           ::=   $<identifier> :
<identifier>         ::=   [a-z]|[A-Z]|'_'
<attributes>         ::=    : internal
          |                 : period (once|<time>)
          |                 : off
          |                 : switch(on|off, <variableList>)
<variableList>       ::=   <variable> , (variable)*
<temporalExpression>         ::= not <temporalExpression>
          |                 <temporalExpression> and <temporalExpression>
          |                 <temporalExpression> or <temporalExpression>
          |                 <temporalExpression>
          |                 <eventExpression>
          |                 ( <temporalExpression> )
<eventExpression>            ::= (<variable> :)? <eventEmitter>
                                  <temporalConstraint>?
<eventEmitter>       ::=   truth(<logicalExpression>)
          |                trend((up|down), <dataExpression>)
          |                comparison((==|!=|>|>=|<|<=),
                           <numericExpression>, <numericExpression>)
          |                range(<numericExpression>, (>|>=),
                           <numericExpression>, (<|<=),
                           <numericExpression>)
          |                gap(<numericExpression> | <logicalExpression>)
```

-continued

```
<logicalExpression> ::= ! <logicalExpression>
              |    <logicalExpression> (== | !=)
                   <logicalExpression>
              |    <logicalExpression> && <logicalExpression>
              |    <logicalExpression> || <logicalExpression>
              |    <numericComparison>
              |    <logicalCalculation> <filterList>
              |    (true | false)
              |    ( <logicalExpression> ) <filterList>
<logicalCalculation>       ::= <logicalIf>
              |    <isAvailable>
<numericComparison>        ::= <numericExpression>
                               (==|!=|>=|>|<=|<) <numericExpression>
              |    <numericExpression> ((==|<=|<)
                   <numericExpression>)+
<logicalIf>      ::=   if(<logicalExpression>,
                   <logicalExpression>, <logicalExpression>)
              |    if(<logicalExpression>, <logicalExpression>)
              |    if(<logicalExpression>)
<isAvailable>    ::=   isAvailable(<logicalExpression> |
                   <numericExpression>)
<numericExpression>      ::= - <numericExpression>
              |    <numericExpression> (*|/) <numericExpression>
              |    <numericExpression> (+|-) <numericExpression>
              |    <numericCalculation> <filterList>
              |    <inputSignalIdentifier> <filterList>
              |    (Integer | Number)
              |    ( <numericExpression> ) <filterList>
<numericCalculation>       ::= <numericIf>
              |    <sdFunction>
              |    <smaFunction>
              |    <emaFunction>
              |    <meanFunction>
              |    <absFunction>
              |    <minFunction>
              |    <maxFunction>
              |    <sumFunction>
              |    <powFunction>
              |    <integralFunction>
              |    <countTrueFunction>
              |    <countPointsFunction>
              |    <gradientFunction>
<numericIf>      ::=   if(<logicalExpression>,
                   <numericExpression>, <numericExpression>)
              |    if(<logicalExpression>, <numericExpression>)
<sdFunction>     ::= sd(<numericCalculation>
                   (,<numericCalculation>)*)
              |    sd (<numericCalculation>,
                   <movingWindowLength>)
<smaFunction>              ::= sma(<numericCalculation>,
                   <movingWindowLength>)
<emaFunction>              ::= ema(<numericCalculation>,
                   <movingWindowLength>)
              |    ema(<numericCalculation>, Float,
                   <movingWindowLength>)
<meanFunction>             ::= mean(<numericCalculation>
                   (,<numericCalculation>)*)
<absFunction>              ::= abs(<numericCalculation>)
<minFunction>              := min(<numericCalculation>
                   (,<numericCalculation>)*)
              |    min(<numericCalculation>,
                   <movingWindowLength>)
<maxFunction>              ::= max(<numericCalculation>
                   (,< numericCalculation>)*)
              |    max(<numericCalculation>,
                   <movingWindowLength>)
<sumFunction>              ::= sum(<numericCalculation>,
                   <movingWindowLength>)
<powFunction>              ::= pow(<numericCalculation>,
                   <numericCalculation>)
<integralFunction>         ::= integral(<numericCalculation>,
                   <movingWindowLength>)
<countTrueFunction>        ::= countTrue(<logicalExpression>,
                   <movingWindowLength>)
<countPointsFunction>        ::= countPoints
                   (<numericCalculation> | <logicalExpression>,
                   <movingWindowTimeLength>)
              |    countPoints(<numericCalculation> |
                   <logicalExpression>)
```

```
<gradientFunction>              ::= gradient(<numericCalculation>)
<movingWindowLength>            ::= <@>? (Integer | <time>)
                                    <Exclamation>?
<movingWindow TimeLength>       ::= <@>? <time> <Exclamation>?
<filterList>                    ::=     <filter>*
<filter>        ::=     : ignorable | : ignorable(true | false)
                |       : once | : once(true | false)
                |       : expires(<time>)
                |       : maxwait(<time>)
                |       : at(Integer | <time>)
<time> (specifies Drools notation)              ::= (Digit+'d')?
                        (Digit+'h')? (Digit+'m')? (Digit+'s')?
                        (Digit+'ms')?
                |       (Digit+'h') (Digit+'m')?
                        (Digit+'s')?(Digit+'ms')?
                |       (Digit+'m') (Digit+'s')? (Digit+'ms')?
                |       (Digit+'s') (Digit+'ms')?
                |       Digit+'ms'
<temporalConstraint>?           ::= <startConstraint>?
                |       <endConstraint>?
                |       <lastConstraint>?
                |       <finishedConstraint>?
                |       <unfinishedConstraint>?
                |       <durationConstraint>?
                |       <maxGapConstraint?
<startConstraint>               ::=     : start (correlationCondition
                                        (,correlationCondition)*)
                |       : s (correlationCondition
                        (,correlationCondition)*)
<endConstraint>                 ::=     : end (correlationCondition
                                        (, constraintOperator)*)
                                        : e (correlationCondition
                                        (,correlationCondition)*)
constraintOperator              ::=     after [<time> (, <time>)?]? variable
                                        Colon (start|s|end|e)
                |       before [<time> (, <time>)?]? variable
                        Colon (start|s|end|e)
                |       coincides [<time>]? variable Colon
                        (start|s|end|e)
                |       over <time>
<lastConstraint>                ::=     : last(Integer|*)
<finishedConstraint>            ::=     : finished
<unfinishedConstraint>          ::=     : unfinished
<durationConstraint>            ::=     : duration((>=|<=) <time>)
                |       : duration (>= <time>, <= <time>)
<maxGapConstraint>              ::=     : maxgap(<time>)
```

The above listed grammar may be used to define various events, correlations between these events as well as queries, which will be described in the following. The term "rule" refers to predefined events.

A formula consists of two parts, a header and a formula expression, separated by a "=" symbol. The formula header has the form "signal ("event name")"; there may be a reference definition for this formula before the expression ("$sl:"). After the expression with leading colon, optional attributes are located in arbitrary order:

":internal" provides that the current signal is used only as an intermediate internal event, generated for other rules within the current bunch of formulas;

":period (once|ime)" applies a filter with the following: "How long it takes after previous event match to consider next match of this formula;"

"once" provides that the rule will execute only one time

Temporal expressions include temporal operands, such as AND, OR, NOT operators (not case-sensitive) and parenthesis:

AND has a greater priority than OR;

NOT refers directly to the next operand (e.g., NOT A AND B provides (NOT A) AND B);

To assign NOT for expression, explicit parenthesis are to be used;

Temporal operand (dataExpression) is an event emitter.

An event emitter includes:

Optional variable definition with "process" (e.g., such an event always starts with "$" symbol);

If the variable is specified, a colon symbol is required after the variable definition;

Definition of process event emitter;

Optional emitter attributes with a leading colon symbol and an arbitrary order.

Event emitter attributes include:

":start ( )" or "s( )"—correlation conditions of the event start are located between parentheses, separated by comma;

Operators "after", "before", "coincides" with optional temporal constraints. Temporal constraints contain references to a binding point as a variable and a bound of an event ("start" or "end") into brackets;

"over lh" specifies the time window of the event start (e.g., whether the event must start within a specified time interval relative to the current moment of time);

If nothing is specified in the parentheses, then this attribute is equivalent to the absence of the start ( ) attribute;

":end( )" of "e( )"—correlation conditions of the event end are located between parentheses, separated by comma;

Operators "after", "before". "coincides" are the same in usage as described above for the start ( ) section;

"over 1h" specifies the time window of the event end (e.g., whether the event must end within a specified time interval relative to the current moment of time);

":last (count)"—window by event count (e.g., how many such last events should be considered);

By default, for all event emitters constraint, ":last(1)" is applied (e.g., such a formula correlates only with the last event from the series, so it is not necessary to specify constraint ":last(1)" explicitly);

To correlate all events, generated by an emitter, ":last(*)" is used;

":finished"—the process described by the event is to have been finished by the moment of the formula activation to consider this event;

":!finished"—the process described by the event is to be unfinished by the moment of the formula activation;

":duration ( )"—describes a minimal and maximal duration of the process;

":duration (>=time)"—describes a minimal process duration after which the process will be recognized;

":duration (<=time)"—describes a maximal process duration during which the process may be still recognized;

":duration (>=time, <=time)"—describes both minimal and maximal durations of the process;

":maxgap (time)"—provides that an emitter restricted with this constraint expects a maximal gap in data to be not greater than the specified time interval. If the emitter does not receive any data within the specified time interval, the emitter assumes that the process is finished, and waits for a new process to start again;

If the maxgap ( ) constraint is omitted, the emitter waits for the next data indefinitely signal (e.g., "Simple finished trend event for last 10 values, which expires in 1m").

Event process emitter (e.g., event process generator) describes:

Identifier of operation (e.g., truth, comparison, etc.);

Operation parameters into parentheses (e.g., mathematical expressions and special expressions, depending on the emitter type).

Truth supports a process while the expression in parenthesis evaluates to true. This may be used as a primary emitter to match processes.

Gap emits events when the data expression contains gaps in the data.

Time duration constraint for the gap emitter has only a >=constraint operator; because of library implementation <=operator drools will emit superfluous events.

Logical expressions contain the following operations:
Logical operators (!, &&, ||);
Logical constants (true, false);
Comparisons of logical values (==, !=);
Numeric comparisons
Comparison of the two numeric values using standard comparison operators;
Chained comparison of several numeric values using ==, <, <=operators;
Logical functions
if (A, B, C) evaluates to B or C depending on value of A;
isAvailable (A) evaluates to true if A is available at the moment of the calculation and evaluates to false otherwise;
Operands for these operations may be
Logical values and constants;
Results of the inner operations;
Logical expressions may be prioritized using parentheses;

Some of operands, such as sub expressions and functions, may be specified with a filter.

Mathematical expressions of the event emitters include the following operations:
Arithmetical operations (*, /, +, −);
Aggregating functions;
Has a mathematical expression as a first parameter. The result of the calculation of this expression will be used as a data source for an aggregating operation;
"sd"—standard deviation function;
"sma", "ema"—average functions;
"mean"—average function of several data expressions;
"integral"—Riemann integral;
Operands for these operations can be
Numbers;
Identifiers of the data source;
Results of the inner operations;
Mathematical expressions may be prioritized using parentheses;

Some of the operands, such as a data source identifier, a sub expression, and aggregating functions, may be specified with filters.

Filters define the behavior of data expression values emitting in the case that new input values cannot be calculated or there are no available values in the data source.

"ignorable"—provides that the result of the data expression specified with this filter may be ignored during other calculations if a new value is undefined (e.g., cannot be calculated);

"once"—provides that the last calculated value of data expression will be used only once; the expression will wait for the next available value to calculate a new result;

"expires"—provides that the result value of the data expression will always be undefined if the last value was calculated earlier than the specified timeout;

Timeout of expiration

"at"—provides that the result of the data expression will be taken from the historical values from the specified index starting from 0 (e.g., last value) or from a specified time point in the past;

"maxwait"—provides that the result of the expression will be produced with specified lateness to handle late data arrival;

The If function has two overloading for numeric values and three overloading for logical values:

With 3 parameters—if the first parameter calculates to true, the if function emits the result of the second parameter; otherwise, the if function emits the result of the third parameter;

With 2 parameters—if the first parameter calculates to true, the if function emits the result of the second parameter; otherwise, the if function emits nothing (effectively filters values of the second parameter);

With 1 parameter (e.g., available only for logical expressions)—if the first parameter calculates to true, the if function emits the value of the first parameter; otherwise, the function emits nothing (e.g., effectively filters out values of the first parameter when not equal to true)

The IsAvailable function calculates if a value is available at the moment of calculation.

The standard deviation function has three overloading:

For number of input expression—calculates a standard deviation for all input values at the moment of the calculation;

For moving window by time—calculates a standard deviation value within the time interval;

For moving window by data values count—calculates a standard deviation value for the last data values from the series;

Time or count parameter may be started from @ to distinguish the window length from the regular input;

Time or count parameter may be specified with exclamation mark suffix, which provides that the function will not calculate values until the sliding window is fulfilled.

The simple moving average function calculates an unweighted average of the previous datum points. The simple moving average function has two overloading:

By time—calculates an average value within the time interval;

By data values count—calculates an average value for the last data values from the series;

Time or count parameter may be specified with exclamation mark, which provides that the function will not calculate values until the sliding window is fulfilled.

The exponential moving average function calculates a weighted average value of the data expression and applies weighting factors that decrease exponentially. The weighting for each older datum point decreases exponentially, never reaching zero. The weighting has four overloading:

By time—calculates an exponential moving average value within the time interval;

By data values count—calculates an exponential moving average value for the last data values from the series With specified alpha parameter [0,1] and by time length;

With specified alpha parameter [0,1] and by data values count;

Time or count parameter may be specified with exclamation mark, which provides that the function will not calculate values until the sliding window is fulfilled.

The mean function calculates the average value of several data expressions.

The abs function calculates the absolute value of the data expression. The max function calculates the maximal value of several data expressions.

For number of input expression—calculates the maximal value for all input values at the moment of the calculation;

For moving window by time—calculates the maximal value within the time interval;

For moving window by data values count—calculates the maximal value for the last data values from the series Time or count parameter may be started from @ to distinguish the window length from the regular input;

Time or count parameter may be specified with exclamation mark suffix, which provides that the function will not calculate values until the sliding window is fulfilled.

The min function calculates the minimal value of several data expressions.

For number of input expression—calculates the minimal value for all input values at the moment of the calculation;

For moving window by time—calculates the minimal value within the time interval;

For moving window by data values count—calculates the minimal value for the last data values from the series Time or count parameter may be started from @ to distinguish the window length from the regular input;

Time or count parameter may be specified with exclamation mark suffix, which provides that the function will not calculate values until the sliding window is fulfilled.

The sum function calculates a sum value of values within the moving window. The sum function has several overloads:

For moving window by time—calculates the minimal value within the time interval;

For moving window by data values count—calculates the minimal value for the last data values from the series;

Time or count parameter may be started from @ to distinguish the window length from the regular input;

Time or count parameter may be specified with exclamation mark suffix, which provides that the function will not calculate values until the sliding window is fulfilled.

The pow function calculates the power of data expressions and includes two parameters:

First parameter—base of power;

Second parameter—exponent.

The integral function calculates a Riemann integral of the previous datum points (e.g., time is applied in seconds). The integral function has two overloading:

For moving window by time—calculates the integral within the time interval

For moving window by data values count—calculates the integral value for the last data values from the series;

Time or count parameter may be started from @ to distinguish the window length from the regular input;

Time or count parameter may be specified with exclamation mark suffix, which provides that the function will not calculate values until the sliding window is fulfilled.

The CountPoints function calculates a count of the previous non null datum points. The CountPoints function has two overloading:

For moving window by time—calculates the count within the time interval;

Without second parameter—calculates the count for data values from the beginning of the processing;

Time parameter may be started from @ to distinguish the window length from the regular input;

Time parameter may be specified with exclamation mark suffix, which provides that the function will not calculate values until the sliding window is fulfilled.

The CountTrue function calculates a count of true values within a moving window. The CountTrue function has two overloading:

For moving window by time—calculates the integral within the time interval;

For moving window by data values count—calculates an integral value for the last data values from the series;

Time or count parameter may be started from @ to distinguish the window length from the regular input;

Time or count parameter may be specified with exclamation mark suffix, which provides that the function will not calculate values until the sliding window is fulfilled.

The gradient function calculates a speed of an input value changing (e.g., time is applied in seconds).

This grammar is only an example and may be reformulated as well as extended.

Figure 3:
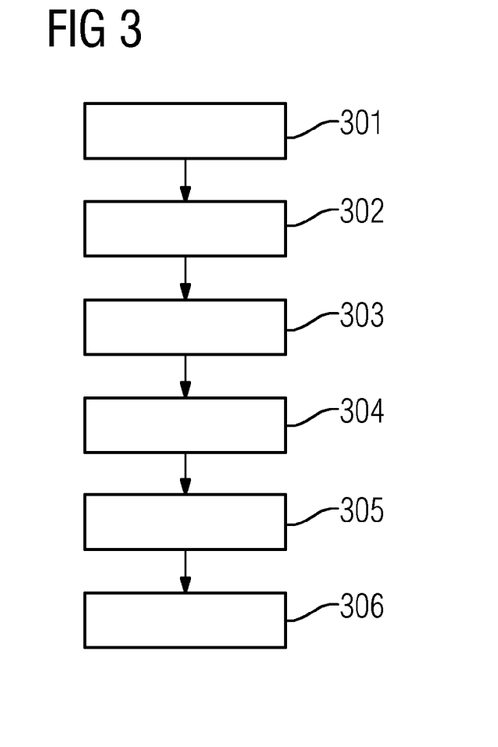
FIG. 3 shows an embodiment of a sequence of method acts for detecting correlations within data received from a technical system.

FIG. 3 shows an embodiment of a sequence of method acts for detecting correlations within data received from a technical system 100.

In act 301, numerical data 11 and logical data 12 are received from the technical system 100.

In act 302, dependencies between data of the numerical data 11 are determined. The dependencies are described by the logical data 12. In act 303, a subset of the numerical data 11 is selected. The subset corresponds to data of the numerical data 11 having dependencies that correspond to predefined conditions.

The numerical data 11 and the logical data 12 are processed in act 304 by converting the numerical data 11 and the logical data 12 into text-based data and by detecting predefined events in the text-based data. This may be done using the above grammar.

In act 305, the detected events are compared with predefined queries to provide a comparison result. The predefined queries describe correlations between detected events. The queries may also be formulated using the above described grammar.

In act 306, a signal 13 is output based on the provided comparison result.

Although the present invention has been described in accordance with exemplary embodiments, modifications are possible in all embodiments.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A computer device for detecting correlations within data received from a technical system, the computer device comprising:
   a receiver configured to receive numerical data and logical data from the technical system;
   a selector configured to:
      determine dependencies between data of the numerical data being described by the logical data; and
      select a subset of the numerical data, the subset of the numerical data corresponding to data of the numerical data having dependencies that correspond to predefined conditions;
   a processor configured to process the subset of the numerical data and the logical data, the process of the subset of the numerical data and the logical data comprising:
      conversion of the subset of the numerical data and the logical data into text-based data; and
      detection of predefined events in the text-based data;
   a comparison unit configured to compare the detected predefined events with predefined queries to provide a comparison result, wherein the predefined queries describe correlations between detected events; and
   a signaling unit configured to output a signal based on the provided comparison result.

2. The computer device of claim 1, wherein the predefined conditions include a start condition, an availability condition, or the start condition and the availability condition.

3. The computer device of claim 1, wherein the signaling unit is configured to output a signal when the comparison result is positive.

4. The computer device of claim 1, wherein the receiver is configured to receive numerical sensor data and logical sensor data from a plurality of sensors of the technical system, numerical measurement data and logical data from at least one measurement unit of the technical system, or a combination thereof.

5. The computer device of claim 1, wherein the receiver is configured to receive operation commands from at least one controller of the technical system, and
   wherein the comparison unit is configured to compare the detected events and the operation commands with predefined queries.

6. The computer device of claim 1, wherein a predefined query describes a correlation between a plurality of detected events.

7. The computer device of claim 6, wherein the predefined query describes a temporal, logical, or temporal and logical correlation between the plurality of detected events.

8. The computer device of claim 1, wherein the processor includes a filter for filtering specific detected events.

9. The computer device of claim 1, wherein the detected events include a trend of the detected event, a gap within the detected event, a minimum value of the detected event, a maximum value of the detected event, an average value of the detected event, or any combination thereof.

10. The computer device of claim 1, further comprising an input device configured to receive input information from a user, the input information including predefined queries.

11. The computer device of claim 10, wherein the input information is in text-based form.

12. A technical system comprising:
   a plurality of sensors configured to provide numerical data and logical data from the technical system; and
   a computer for detecting correlations within data received from the technical system, the computer comprising:
      a receiver configured to receive the numerical data and the logical data from the technical system;
      a selector configured to:
         determine dependencies between data of the numerical data being described by the logical data; and
         select a subset of the numerical data, the subset of the numerical data corresponding to data of the numerical data having dependencies that correspond to predefined conditions;
      a processor configured to process the subset of the numerical data and the logical data, the process of the subset of the numerical data and the logical data comprising:
         conversion of the subset of the numerical data and the logical data into text-based data; and
         detection of predefined events in the text-based data;
      a comparison unit configured to compare the detected predefined events with predefined queries to provide a comparison result, wherein the predefined queries describe correlations between detected events; and
      a signaling unit configured to output a signal based on the provided comparison result.

13. The technical system of claim 12, wherein the technical system is a wind turbine, a gas turbine, a steam turbine, a compressor, a generator, or any combination thereof.

14. A method for detecting correlations within data received from a technical system, the method comprising:
   receiving numerical data and logical data from the technical system;
   determining dependencies between data of the numerical data being described by the logical data;
   selecting a subset of the numerical data, the subset corresponding to data of the numerical data having dependencies that correspond to predefined conditions;
   processing the subset of the numerical data and the logical data, the processing comprising converting the subset of the numerical data and the logical data into text-based data and detecting predefined events in the text-based data;

comparing the detected events with predefined queries to provide a comparison result, wherein the predefined queries describe correlations between detected events; and outputting a signal based on the provided comparison result.

15. A computer program product comprising a non-transitory computer-readable storage medium storing instructions executable by a computer device for detecting correlations within data received from a technical system, the instructions comprising:

receiving numerical data and logical data technical system;

determining dependencies between data of the numerical data being described by the logical data;

selecting a subset of the numerical data, the subset of the numerical data corresponding to data of the numerical data having dependencies that correspond to predefined conditions;

processing the subset of the numerical data and the logical data, the processing of the subset of the numerical data and the logical data comprising:

converting the subset of the numerical data and the logical data into text-based data; and detecting predefined events in the text-based data;

comparing the detected predefined events with predefined queries to provide a comparison result, wherein the predefined queries describe correlations between detected events; and outputting a signal based on the provided comparison result.

16. The computer program product of claim 15, wherein the instructions further comprise:

receiving operation commands from at least one controller of the technical system; and comparing the detected events and the operation commands with predefined queries.

17. The computer program product of claim 16, wherein a predefined query describes a correlation between a plurality of detected events.

18. The computer program product of claim 17, wherein the predefined query describes a temporal, logical, or temporal and logical correlation between the plurality of detected events.

* * * * *